United States Patent
Righi et al.

(10) Patent No.: US 7,673,301 B1
(45) Date of Patent: *Mar. 2, 2010

(54) METHODS AND SYSTEMS FOR UPDATING AND RECOVERING FIRMWARE WITHIN A COMPUTING DEVICE OVER A DISTRIBUTED NETWORK

(75) Inventors: Stefano Righi, Lawrenceville, GA (US); Brian Richardson, Loganville, GA (US); Jerry Petree, Alpharetta, GA (US)

(73) Assignee: American Megatrends, Inc., Norcross, GA (US)

( * ) Notice: Subject to any disclaimer, the term of this patent is extended or adjusted under 35 U.S.C. 154(b) by 968 days.

This patent is subject to a terminal disclaimer.

(21) Appl. No.: 10/771,245

(22) Filed: Feb. 3, 2004

Related U.S. Application Data (60) Provisional application No. 60/450,039, filed on Feb. 26, 2003.

(51) Int. Cl.
 G06F 9/44 (2006.01)
 G06F 15/16 (2006.01)
 G06F 15/177 (2006.01)

(52) U.S. Cl. .................. 717/172; 709/202; 709/221; 713/2

(58) Field of Classification Search .......... 717/168, 717/171, 172
 See application file for complete search history.

(56) References Cited

U.S. PATENT DOCUMENTS

| | | | |
|---|---|---|---|
| 5,596,713 A | 1/1997 | DeRoo et al. | |
| 6,175,919 B1 | 1/2001 | Ha | |
| 6,266,809 B1 * | 7/2001 | Craig et al. | ............... 717/173 |
| 6,438,688 B1 | 8/2002 | Nunn | |
| 6,640,334 B1 | 10/2003 | Rasmussen | |
| 6,732,267 B1 * | 5/2004 | Wu et al. | ................. 713/100 |
| 6,970,917 B1 | 11/2005 | Kushwaha et al. | |
| 7,080,134 B2 * | 7/2006 | Doherty et al. | ............ 709/221 |
| 7,293,169 B1 | 11/2007 | Righi et al. | |
| 2002/0002688 A1 * | 1/2002 | Gregg et al. | ................ 713/202 |
| 2002/0129159 A1 * | 9/2002 | Luby et al. | .................. 709/236 |
| 2003/0165230 A1 * | 9/2003 | Reuss | .................... 379/265.02 |
| 2003/0204843 A1 * | 10/2003 | Barmettler et al. | .......... 717/178 |

(Continued)

OTHER PUBLICATIONS

Harold, Java Network Programming, Jul. 2000, O'Reilly, 2nd Edition, sections 2.3 and 6.1, and Chapter 13.*

(Continued)

*Primary Examiner*—Tuan Q Dam
*Assistant Examiner*—James Rutten
(74) *Attorney, Agent, or Firm*—Hope Baldauff Hartman, LLC (57) ABSTRACT

Methods and systems are provided for updating and recovering firmware within computers over a distributed network. While a computer is in an operating system independent state, a determination is made as to whether the firmware within the computer is valid. The firmware may be the BIOS for the computer. If it is determined that the current firmware is invalid, a recovery request is sent to a manager computer monitoring for recovery requests. The manager computer sends a new firmware image over the network to the computer. The invalid firmware is then updated with the new firmware image. An instruction to update the firmware of the computer may also be sent from a manager computer to computers monitoring for instructions. When the instruction is received, the computer transitions to an operating system independent recovery state, receives a new firmware image over the network, and updates with the new firmware image.

32 Claims, 5 Drawing Sheets

U.S. PATENT DOCUMENTS

2004/0015952 A1  1/2004  Lajoie et al.
2004/0181691 A1* 9/2004  Armingaud et al. ......... 713/201

OTHER PUBLICATIONS

U.S. Official Action dated Jan. 16, 2007 in U.S. Appl. No. 10/770,951.
U.S. Official Action dated Jul. 2, 2007 in U.S. Appl. No. 10/770,951.
U.S. Notice of Allowance / Allowability dated Feb. 25, 2008 in U.S. Appl. No. 10/770,951.
U.S. Official Action dated May 16, 2006 in U.S. Appl. No. 10/771,016.
U.S. Official Action dated Nov. 2, 2006 in U.S. Appl. No. 10/771,016.
U.S. Official Action dated Apr. 20, 2007 in U.S. Appl. No. 10/771,016.
U.S. Notice of Allowance / Allowability dated Jun. 28, 2007 in U.S. Appl. No. 10/771,016.
U.S. Appl. No. 10/770,951 filed Feb. 3, 2004, entitled "Methods and Systems for Updating the Firmware on a Plurality of Network-Attached Computing Devices" Inventors: Righi et al.

* cited by examiner

METHODS AND SYSTEMS FOR UPDATING AND RECOVERING FIRMWARE WITHIN A COMPUTING DEVICE OVER A DISTRIBUTED NETWORK

CROSS REFERENCE TO RELATED APPLICATIONS

The present application claims priority under 35 U.S.C. § 119 to co-pending U.S. provisional application No. 60/450,039 entitled "Methods and Systems For Updating a Computer Basic Input/Output System Over a Distributed Computing Network," filed on Feb. 26, 2003, and which is expressly incorporated herein by reference.

TECHNICAL FIELD

The present invention is related to remote management features of a computer system. More particularly, the present invention is related to methods and systems for remotely recovering the firmware of one or more network-attached computing devices over a distributed computing network.

BACKGROUND OF THE INVENTION

Reducing the time and labor of update or recovery operations on server and/or client computers is an ongoing objective of network administrators and computer system manufacturers. In many modern computer systems, the firmware, such as the basic input/output system ("BIOS"), is stored as groups of memory blocks in one or more re-programmable memory devices. These re-programmable memory devices, typically known as "flash" parts, are a type of non-volatile random access memory ("NVRAM") that allows the firmware BIOS to be recovered or updated by using software to erase and program each flash part.

Previous methods for maintaining and recovering firmware stored on the flash memory of a computer system require a video display and input device connected to the computer to be updated and direct contact with the computer to be updated through the display and input device. In one method, the firmware in previous systems is recovered by utilizing an application program that utilizes files containing the updated firmware stored on a local device or available through a serial port connection. In the alternative, a BIOS image recovery update may occur in previous systems through a program provided within the BIOS. While both of these methods for updating and recovering the firmware of a computer system work well when a display and/or keyboard are available and when physical access to the computer may be had, headless computers and server computers within server farms are usually without a console and are remotely operated.

Removing the need to physically operate each computer in preparation to execute an emergency or routine recovery procedure for an image of the firmware is especially critical for headless or remote computers that need updating without utilizing a display, keyboard, or floppy drive. For instance, manually providing a new BIOS recovery image for each computer in a server farm can take an excessive amount of time and administrative labor. Furthermore, updates that occur on various network attached computers having various operating systems become even more complex, potentially requiring a different update procedure for each computer depending on the computer's operating system manufacturer or version.

It is with respect to these considerations and others that the present invention has been made.

SUMMARY OF THE INVENTION

In accordance with the present invention, the above and other problems are solved by methods and systems for updating and or recovering firmware, such as the BIOS, within a computing device over a distributed network. According to one method for updating firmware, an instruction to begin a firmware recovery procedure is received at a computing device, such as a network attached computer, over the distributed network from a manager computer. The network attached computer may monitor a communication port for instruction activity via an operating system ("OS") dependent recovery application executing on the network attached computer. In response to receiving the instruction, the network attached computer transitions to a recovery state. The recovery state may be an OS independent state. The network attached computer then receives a new firmware image over the distributed network from the manager computer. Once the new firmware image is received, the current firmware within the network attached computer is then updated with the new firmware image.

Another embodiment of the present invention is a method for recovering firmware on a network attached computer over a distributed network. The method involves sending a recovery request from the network attached computer over the distributed network to a recovery manager computer. The recovery request may be sent while the network attached computer is in an OS independent state in response to determining that a firmware image is invalid. The recovery manager computer monitors a communication port for recovery requests. Next, in response to sending the recovery request, the network attached computer receives a new firmware image over the distributed network from the recovery manager computer. Once the new firmware image is received at the network attached computer, the firmware is recovered by updating the current firmware with the new firmware image.

Still another embodiment of the present invention is a system for updating and or recovering the firmware of a network attached computer over a distributed network. The system includes a manager computer operative to send an instruction to update the firmware of the network attached computer over the network and monitor a communication port of the manager computer for recovery requests. The manager computer is also operative to receive a notification of readiness to update or a recovery request from the network attached computer. In response to receiving the notification of readiness or the recovery request, the manager computer sends a new firmware image over the network to the network attached computer.

The system also includes a network attached computer operative to monitor a communications port of the network attached computer for the instruction to update the firmware. The network attached computer is also operative to determine whether its current firmware is invalid. This determination may be made while the network attached computer is in an OS independent state during the boot of the network attached computer. When the network attached computer determines that the current firmware is invalid, the boot is interrupted and a recovery request is sent over the network. In contrast, when the network attached computer receives the instruction to update the firmware, it transitions to an OS independent recovery state. After transitioning to the recovery state, the network attached computer sends the notification of readiness to the manager computer over the network. The new firmware image may then be received by the network attached computer in response to sending the notification of readiness or sending the recovery request to the manager computer. Once the new firmware image is received, the network attached computer updates the current firmware with the new firmware image.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for updating or recovering firmware within a computing device over a distributed network. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
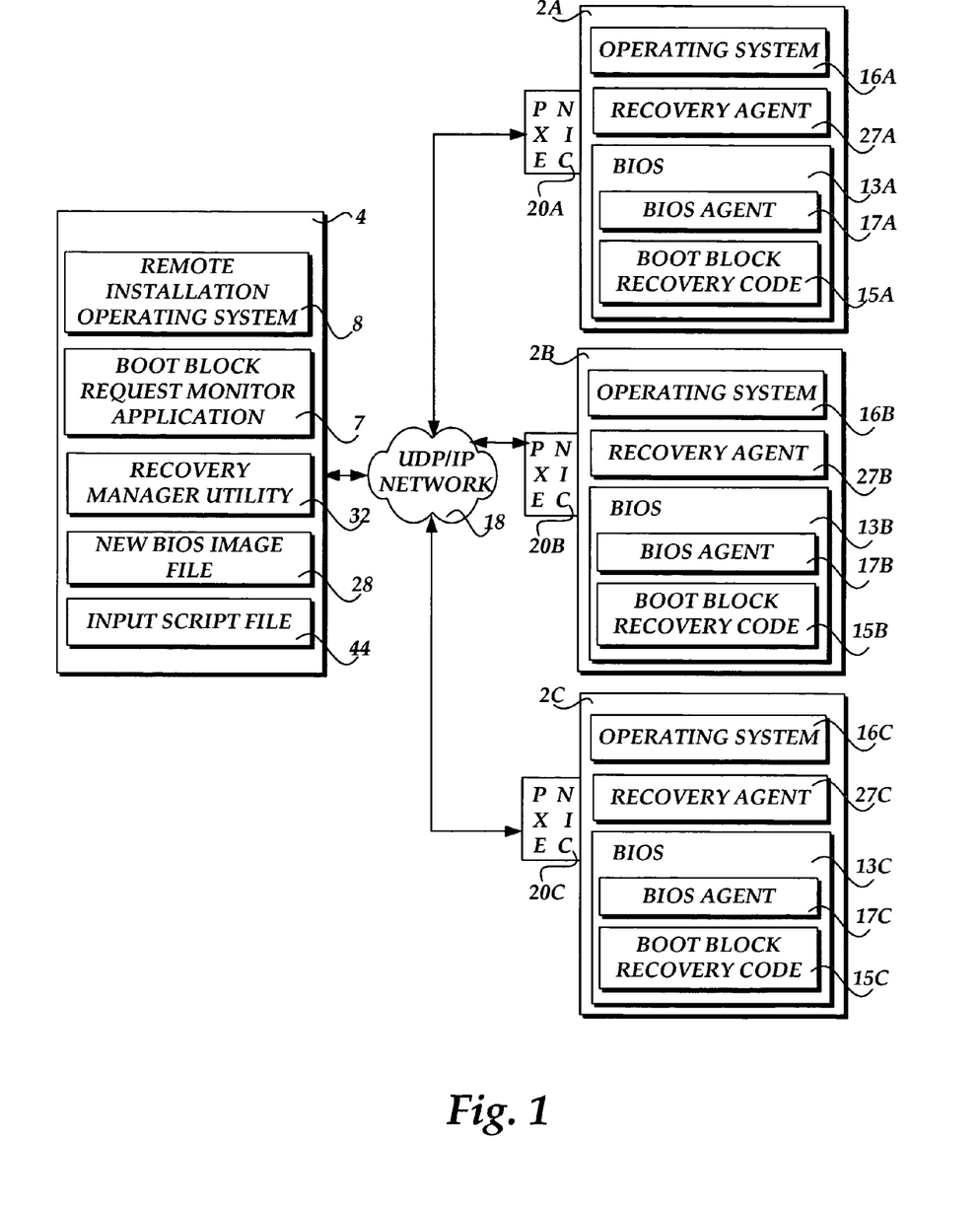
FIG. 1 is a schematic diagram illustrating aspects of a client/server network utilized in an embodiment of the invention.
Figure 2:
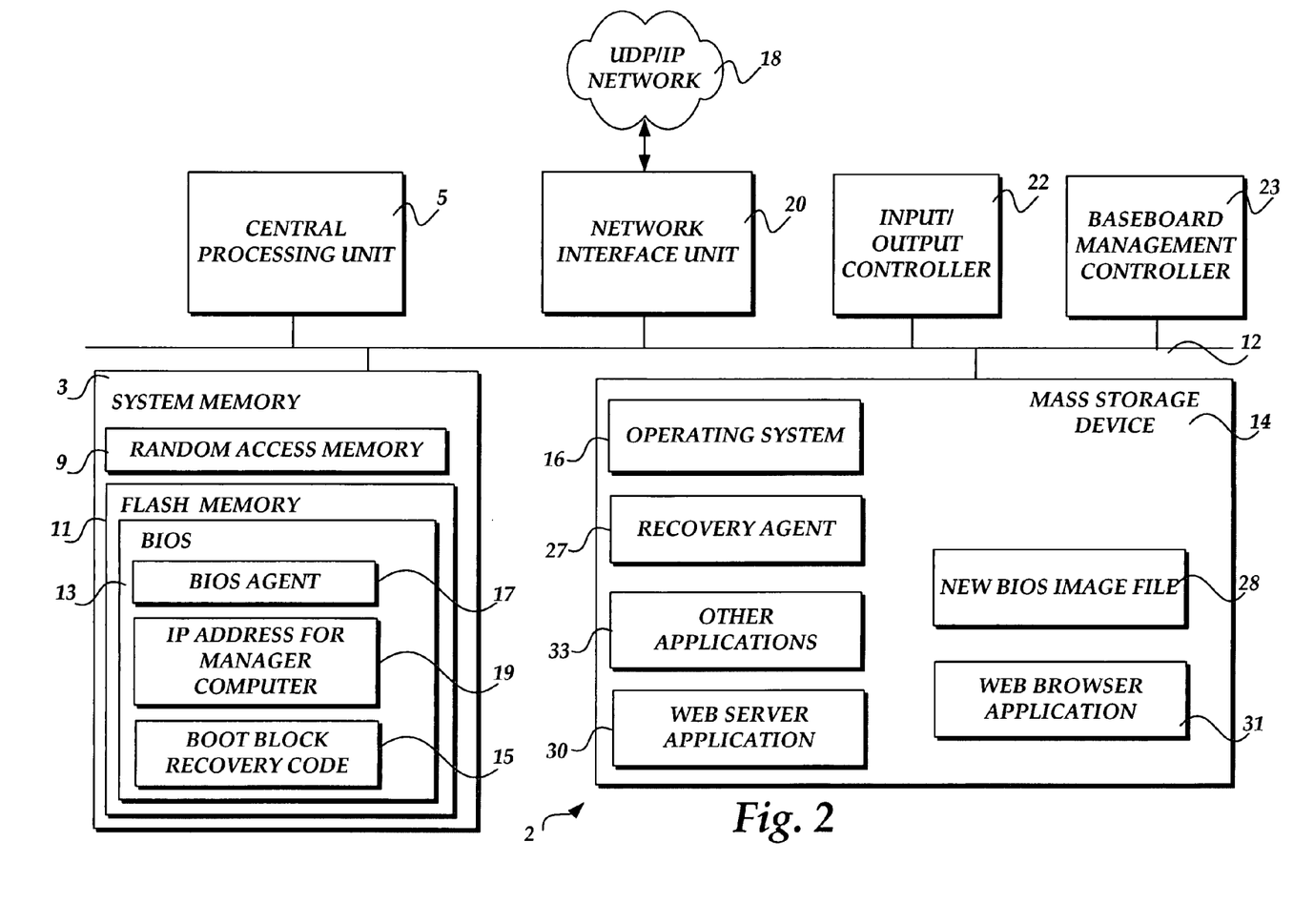
FIG. 2 illustrates a computer system architecture for a network attached computer utilized in embodiments of the invention.
Figure 3:
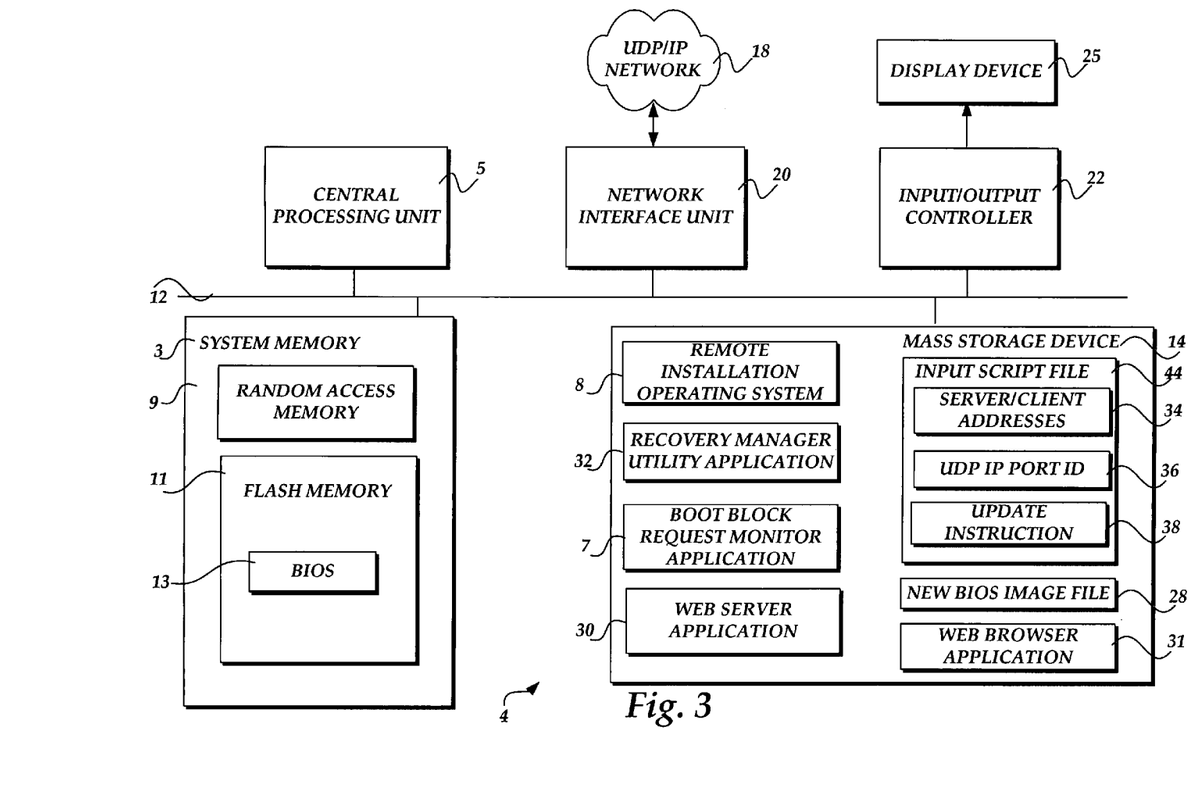
FIG. 3 illustrates a computer system architecture for a network attached firmware recovery manager computer utilized in embodiments of the invention.

Referring now to the drawings, in which like numerals represent like elements through the several figures, aspects of the present invention and the exemplary operating environment will be described. FIGS. 1-3 and the following discussion are intended to provide a brief, general description of a suitable computing environment in which the embodiments of the invention may be implemented. While the invention will be described in the general context of program modules that execute to update a firmware BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a system for remotely updating and or recovering the firmware within one or more computing devices, such as network attached computers, over a network will be described. As shown in FIG. 1, the system includes a manager computer 4. The manager computer 4 comprises a standard personal or server computer operative to execute a recovery manager utility application 32, which operates in response to user initiation or in conjunction with input script file 44 to send update instructions to one or more remote or network attached computers, represented by the network attached computers 2A-2C, over the network 18. As will be described in greater detail below with respect to FIG. 3, the input script file 44 contains data that assists the recovery manager utility application 32 in identifying the remote computers 2A-2C that should be updated and the communication ports of the remote computers designated for listening to or monitoring instruction activity.

The manager computer 4 is connected to a network 18, such as a LAN, WAN, or other type of distributed computing network, such as the Internet, that supports the user datagram protocol/Internet protocol ("UDP/IP"). It should be appreciated, however, that the recovery manager computer 4 may be configured for communication over other types of networks including wireless networks. Alternatively, the recovery manager computer 4 may comprise another type of computing device operative to access the network 18, such as a personal digital assistant or other type of computer.

The recovery manager computer 4 also includes a new BIOS image file 28 for use in updating the BIOS 13A-13C of at least one of the computers 2A-2C over the network 18. The BIOS image file 28 may be a copy or an updated version of the BIOS 13A-13C. Updates to the BIOS 13A-13C utilizing the BIOS image file 28 may be performed in order to update the BIOS 13A-13C after the BIOS version has changed or to recover the BIOS 13A-13C after it has been erased or otherwise corrupted. In particular, the BIOS image file 28 is remotely sent from the recovery manager computer 4 over the network 18 to the memory of at least one of the network attached computers 2A-2C that receives an update instruction from the manager computer 4. The BIOS image file 28 may also be sent to a network attached computer 2A-2C in response to the transmittal of a recovery request from boot block recovery code 15A-15C executing on one of the computers 2A-2C. Such a request is typically sent in response to detecting an invalid BIOS during a boot of the network attached computer 2A-2C.

The recovery manager computer 4 is also equipped with a boot block request monitor application 7 that monitors a communication port of the manager computer for recovery requests transmitted from boot block recovery code 15A-15C executing on the network attached computers 2A-2C. Additionally, the manager computer 4 includes an operating system 8 equipped with remote installation services for installing the BIOS image file 28 in the memory of at least one network attached computer 2A-2C over the network 18. The remote installation services are utilized in a pre-boot execution environment ("PXE") pronounced pixie. PXE is one component or element of the wired for management ("WFM") specification promulgated by INTEL CORPORATION. It allows the network attached computers 2A-2C to boot from the manager computer 4 over the network 18 prior to booting the operating system 16 on the local hard drive of the network attached computer. A PXE-enabled computer connects its network interface card ("NIC"), such as the NICs 20A-20C, to the network 18 via a jumper, which keeps the computer connected to the network even when the power is off. Because a network administrator does not have to physically visit the specific network attached computer and manually boot it, operating systems and other software, such as diagnostic programs, can be loaded onto the computing device from a server, such as the manager computer 4, over a network, such as the network 18. PXE is a mandatory element of the WFM specification. To be considered compliant, the PXE must be supported by the computer's BIOS and NIC.

The remote computers 2A-2C may comprise a network of standard desktop computers, a network of headless computers and/or a farm of server computers, routers, peer devices, or other common network nodes. The remote computers 2A-2C are connected to the network 18 and are operative to execute the recovery OS agent applications 27A-27C, respectively. The recovery OS agent applications 27A-27C operate in conjunction with the operating systems 16A-16C to monitor or "listen" on an assigned communication port, for instructions transmitted to the network-attached computers 2A-2C. The recovery manager utility 32 may send an update instruction over the network 18 to a recovery OS application executing on a networked attached computer and monitoring a communication port for instruction activity. Once a recovery OS agent application, such as 27A, receives an update instruction from the recovery manager utility application 32, the recovery OS agent application transitions the network attached computer to an OS independent recovery state while initiating a reboot of the network attached computer. An OS independent recovery state is an operating state where the OS is neither executing nor available. This transition allows for updates to the BIOS 13 independent of the version or type of operating system 16 each network attached computer 2A-2C executes.

Upon transitioning to the OS independent recovery state, control passes to a BIOS agent application 17A-17C. The BIOS agent applications 17A-17C execute in the OS independent recovery state to send a notification of readiness to update over the network 18 to the manager computer 4. Upon receiving the notification of readiness, the manager computer 4, via the remote installation services, sends the BIOS image file 28 over the network 18 to the PXE enabled NIC 20 for installation within the memory of the network attached computer 2. For instance, the BIOS image file 28 may be transmitted in fragments from the manager computer 4 to the network attached computer 2A. Once the entire BIOS image file 28 has been received into the memory of the network attached computer 2A, the update process is continued. For instance, when the entire BIOS image file 28 has been received, the BIOS agent application 17A executes instructions to erase and replace the current BIOS 13A image file with the BIOS image file 28. Additional details regarding transmission of the BIOS image file 28 fragments and remote firmware updates will be described below with respect to FIGS. 4-5.

Referring now to FIG. 2, an illustrative computer architecture for a computing system 2 for practicing the various embodiments of the invention will be described. The computer architecture shown in FIG. 2 illustrates a conventional server, or personal computer 2, including a central processing unit 5 ("CPU"), a system memory 3, including a random access memory 9 ("RAM") and a flash memory 11, and a system bus 12 that couples the memory to the CPU 5.

A basic input/output system ("BIOS") 13 containing the basic routines that help to transfer information between elements within the computer, such as during startup, is stored in the flash memory 11. The BIOS 13 is the firmware program the CPU 5 uses to get the computer system started after it is powered on. During boot, the BIOS 13 also manages data flow between the OS 16 and attached devices such as a hard disk, video adapter, keyboard, mouse and printer. The BIOS 13 is an integral part of the computer and comes with it from the manufacturer. In contrast, the OS can either be preinstalled by the manufacturer or vendor or installed by the user. The BIOS 13 is made accessible to the microprocessors on an erasable programmable read-only memory "EPROM" chip. When the computer 2 is powered on, the CPU 5 passes control to the BIOS program, which is always located at the same place on the flash memory 11.

When the BIOS 13 boots up the computer, it first determines whether all of the attachments are in place and operational and then it loads the OS, or key parts of it, into a computer's RAM from a hard disk or diskette drive. Sometimes changes can be made to the system configuration during BIOS setup. As described herein, in order to store the maximum amount of data on the flash memory 11, portions of the BIOS may be stored in a compressed format. The compressed portions are decompressed prior to execution by the CPU 5.

The boot block recovery code 15 is also stored in the BIOS 13 to detect invalid firmware and, in response, interrupt boot operations to notify the manager computer 4 that a new firmware image is needed. Additional details regarding boot block recovery are disclosed U.S. Pat. No. 7,322,029 filed May 8, 2003 and entitled "Method and System for Recovering Program Code in a Computer System" which is hereby incorporated by reference. The BIOS 13 also includes an IP address 19 for the manager computer 4. The IP address 19 is used by the boot block recovery code to determine where the recovery request should be sent. In the alternative, the computer 2 may be equipped with a baseboard management controller 23 to identify the location of the manager computer 4.

The network attached computer 2 further includes a mass storage device 14 for storing an OS 16 and OS-dependent application programs such as the recovery agent application 27 for monitoring and responding to update instructions from the manager computer 4. Once received from the manager computer 4, the new BIOS image file 28 for updating the BIOS 13 may also be stored on the storage device 14. As discussed in greater detail below with respect to FIG. 4, upon receiving the new BIOS image file 28, the BIOS 13 is updated with the new BIOS image 28.

As mentioned briefly above, a number of program modules and data files may be stored in the mass storage device 14 and RAM 9 of the computer 2, including an operating system 16 suitable for controlling the operation of a networked personal or server computer, such as the WINDOWS XP operating system from MICROSOFT CORPORATION of Redmond, Wash., the LINUX operating system, DOS, and the Free BSD operating system. The network attached computer 2 may also be operative to execute a Web server application 30, a Web browser application 31, such as the INTERNET EXPLORER browser from MICROSOFT CORPORATION of Redmond, Wash., and other OS-dependent application programs 33 such as a word processing program. The mass storage device 14 is connected to the CPU 5 through a mass storage controller (not shown) connected to the bus 12. The mass storage device 14 and its associated computer-readable media, provide non-volatile storage for the computer 2. Although the description of computer-readable media contained herein refers to a data storage device such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as a LAN, WAN, or a large scale distributed computing network such as the Internet. The computer 2 may connect to the network 18 through a network interface unit 20 connected to the bus 12. It should be appreciated that the network interface unit 20 may also be utilized to connect to other types of networks and remote computer systems, including wireless networks. The computer 2 may also include an input/output controller 22 for receiving and processing input from a number of devices, including a keyboard, mouse, or electronic stylus (not shown in FIG. 2). Similarly, an input/output controller 22 may provide output to a display screen, a printer, or other type of output device. It should be appreciated that the computer 2 may be a headless computer not utilizing or possessing display output or keyboard input capabilities. The computer 2 may also be without local floppy storage or serial port access.

Turning now to FIG. 3, an illustrative computer architecture for a manager computer 4 for practicing the various embodiments of the invention will be described. The computer architecture shown in FIG. 3 illustrates a conventional server or personal computer, including a CPU 5 and a system memory 3 containing the components described above with respect to FIG. 2. The manager computer system 4 also includes a mass storage device 14 for storing an OS 8 equipped with remote installation services and storing application programs, such as the manager utility application 32. The manager utility application 32 initiates and sends update instructions from the manager computer 4 to the network attached computers 2A-2C. The mass storage device 14 may also store the boot block request monitor application 7, the new BIOS image 28, and the input script file 44.

The recovery manager utility application 32 utilizes the input script file 44 to send an update instruction to designated network attached computers. The input script file 44 stores the network addresses 34 of all the computers 2 that are to be updated, identifies the communication ports 36 monitored by the recovery OS agent applications 27 described above in FIGS. 1-2, and also includes the update instruction 38 transmitted to a network attached computer 2 to initiate an update. The manager computer 4 may also be operative to execute a Web server application 30 and a Web browser application 31 as described above in FIG. 2. Additionally, the manager computer may include a display device 25 for displaying update progress via a graphical user interface.

Figure 4:
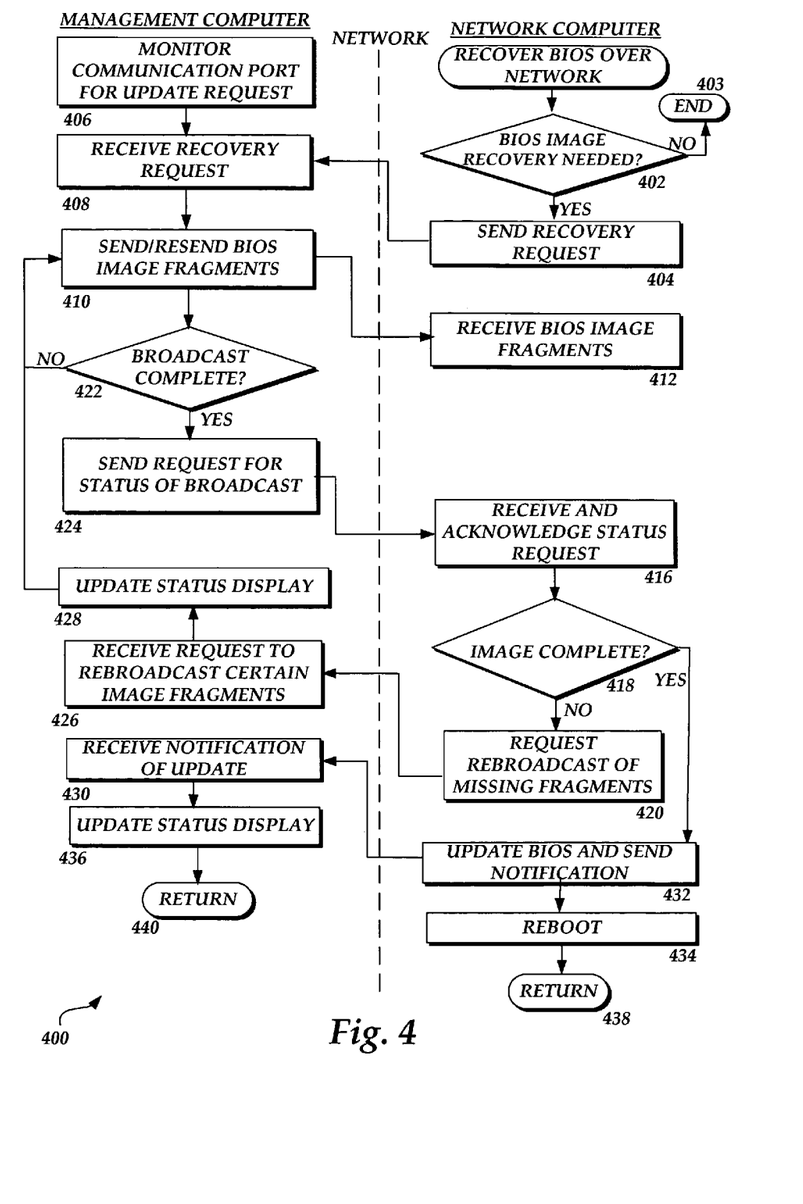
FIG. 4 illustrates an operational flow performed in recovering firmware over a network according to an embodiment of the invention.

Turning now to FIGS. 1 and 4, an illustrative operational flow 400 will be described for recovering the firmware of at least one network attached computer 2A-2C over the network 18 in response to a request from a network attached computer. It should be appreciated that the number of remote computers 2 on the network 18 may vary from one up to and beyond one hundred. The operational flow 400 begins at operation 402 where the boot block recovery code 15 of a network attached computer, for instance the computer 2A, determines that BIOS image recovery is needed. This determination may be in response to an attempt to boot the computer 2A and detecting that all or a portion of the current BIOS has either been corrupted or erased. In response to determining that BIOS recovery is needed, the operational flow 400 continues to operation 404 where a recovery request is sent to the manager computer 4.

The manager computer 4 monitors a communication port for recovery requests at operation 406. Next, the operational flow continues from operations 406 and 404 to operation 408 where the recovery request is received by the manager computer 4. The operational flow then continues to operation 410 where, in response to receiving the recovery request, the remote installation services of the operating system 8 sends the BIOS image file 28 in fragments over the network 18 to the network attached computer 2A. Utilizing the UDP/IP, the manager computer 4 sends the BIOS image file in UDP broadcast fragments of predefined length. Each broadcast fragment may also be numbered. Broadcast packets do not require a point-to-point link between client and server thus, allowing a single broadcast to service multiple computers. The operational flow then continues from operation 410 to operations 412 and 422.

At operation 412 broadcast packet fragments of the BIOS image file 28 are received by the BIOS agent application 17A executing on the computer 2A. Meanwhile, at operation 422 a determination is made as to whether the complete image has been sent. If the complete image has not been sent, the operational flow 400 returns to operation 410 where additional fragments are sent until the broadcast is complete. Once the broadcast of the BIOS image file 28 is completed, the operational flow continues to operation 424, described below.

Returning to operation 412, the BIOS agent application 17A continues to receive the broadcast packet fragments until the broadcast is complete. Meanwhile upon completion of the broadcast at operation 424, a request for status of the image broadcast is sent from the manager computer 4 to the computer 2A. The operational flow 400 then continues from operation 424 to operation 416. At operation 416 the status request is received by the BIOS agent 17A. The operational flow 400 then continues to operation 418.

At operation 418, the BIOS agent 17A verifies the validity and integrity of the BIOS image 28. If the BIOS image is complete, the operational flow 400 continues from operation 418 to operation 432 described below. If the BIOS image 28 is incomplete, the operational flow 400 continues to operation 420 where a request for the rebroadcast of missing or corrupted fragments is sent to the manager computer 4. It should be appreciated that numbers identifying the missing or corrupted fragments may be included in the request. The operational flow 400 then continues to operation 426 where the rebroadcast request is received at the manager computer 4. The operational flow 400 then continues to operation 428 where a graphical status interface is updated to display the progress of update operations. The status display may be updated via the input/output controller 22 and display device 25 described above in FIG. 2. The operational flow then returns to operation 410 where the missing or corrupted fragments of the BIOS image are rebroadcast to the BIOS agent 17A.

At operation 432, in response to the BIOS image 28 being valid and complete, the BIOS agent 17A flashes the current BIOS with the new BIOS image 28. The BIOS agent 17A also sends notification of the update to the manager computer 4. It should be appreciated that the BIOS agent 17A will not acknowledge any network requests or instructions until the update is completed. The operational flow 400 then continues to operations 434 and 430. At operation 434, the BIOS agent 17A reboots the computer 2A with the new BIOS image 28 and returns control to other operations at return operation 438. At operation 430, the manager computer 4 receives the notification of the update. The operational flow 400 then continues to operation 436 where the status display is updated based on the notification of update. The operational flow 400 then returns control to other operations at return operation 440.

Figure 5:
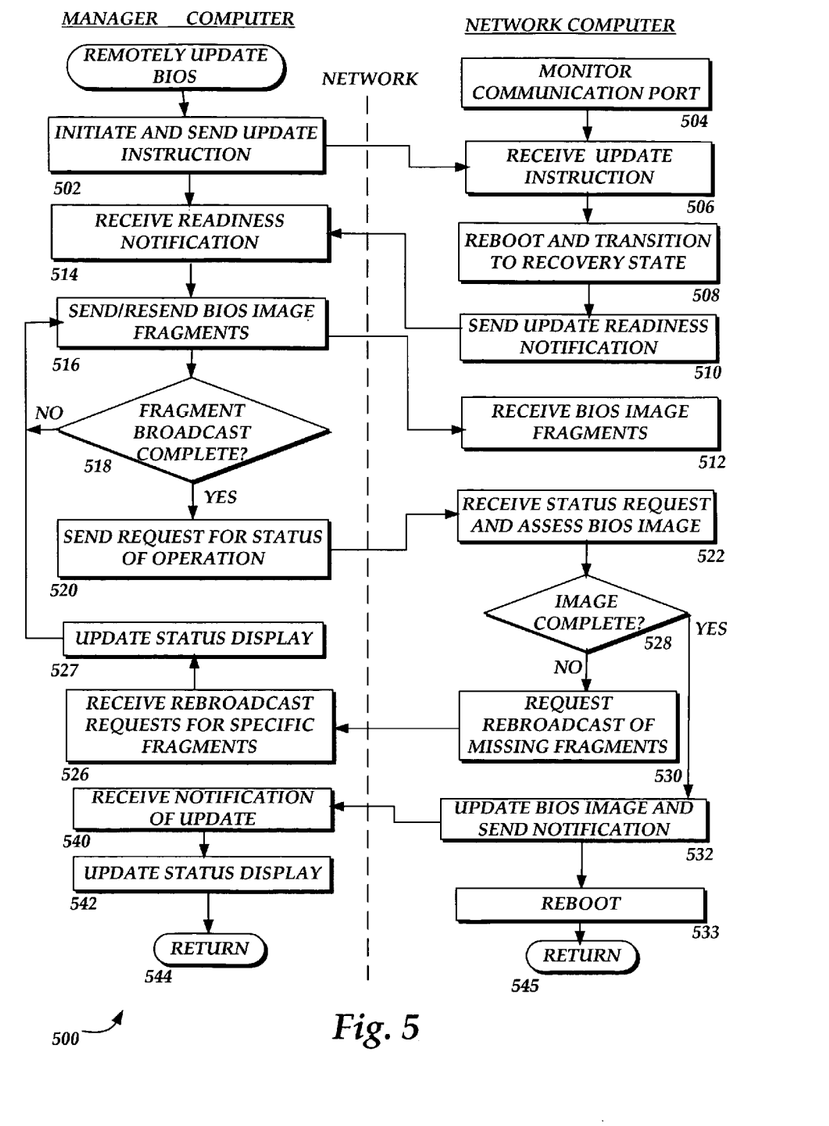
FIG. 5 illustrates an operational flow performed in updating firmware over a network according to an embodiment of the invention.

Referring now to FIGS. 1, 3, and 5, an illustrative operational flow 500 for updating firmware over a network in response to a command from the manager computer 4 according to an embodiment of the present invention will be described. The operational flow begins at operation 502 where the manager computer 4, initiates and sends an update instruction over the network 18 to a network attached computing device, such as the computer 2A. It should be appreciated that other protocols, such as transmission control protocol ("TCP/IP"), may be utilized to send the update instruction over the network 18 to the recovery OS agent application 27. The update instruction 38 requests an update to the BIOS, such as the BIOS 13A, in a maintenance operation.

The manager computer 4 locates the network attached computer 2A by determining the network address 34 of the computer 2A. The manager computer 4 also determines the communication port 36 that the recovery OS agent application 27A is simultaneously monitoring at operation 504. The input script file 44 stored on the manager computer 4 contains the network addresses 34 of all the network attached computers available for update and the communication ports 36 that the recovery OS agent applications, executing on each available computer, are monitoring. It should be appreciated that each recovery OS agent application 27 utilizes only one communication port 36, occupies minimal system memory 3, and only consumes additional CPU 5 resources upon receiving the update instruction 38. The input script file 44 also contains the update instruction 38.

Next, the operational flow 500 continues from operations 502 and 504 to operation 506 where the update instruction is received by the recovery OS agent application 27A at the network attached computer 2A. In response to receiving the update instruction 38, the operational flow 500 continues to operation 508 where the recovery OS agent application 27A reboots the network attached computer and transitions to a recovery state where the OS is neither executing or available. Updating the BIOS during an OS-independent recovery state enables the manager computer 4 to interface with and update the network attached computers regardless of the type or version of operating system a network attached computer executes The operational flow 500 then continues to operation 510 where the BIOS agent application 17A takes control and sends a notification of readiness to update to the manager computer 4 over the network 18. Next, the operational flow 500 continues to operation 514 where the manager computer 4 receives the notification of readiness. In response to receiving the notification of readiness, the operational flow 500 continues to operation 516 where the manager computer 4 sends the new BIOS image file 28 over the network 18 to the network attached computer 2A. It should be appreciated that the BIOS image file may be sent in the form of broadcast fragments of a predefined length where each fragment is numbered. The operational flow 500 then asynchronously continues to operations 518 and 512.

At operation 512, broadcast packet fragments of the BIOS image file 28 are received at the computer 2A. Meanwhile, at operation 518 a determination is made as to whether the complete image has been sent. If the complete image has not been sent, the operational flow 500 returns to operation 516 where additional fragments are sent until the broadcast is complete. Once the broadcast of the BIOS image file 28 has been completed, the operational flow continues to operation 520 described below.

Returning to operation 512, the BIOS agent application 17A continues to receive the broadcast packet fragments until the broadcast is complete. Meanwhile upon completion of the broadcast at operation 520, a request for status of the image broadcast is sent from the manager computer 4 to the computer 2A. The operational flow 500 then continues from operation 520 to operation 522. At operation 522, the status request is received by the BIOS agent 17A. The operational flow 500 then continues to operation 528.

At operation 528, the BIOS agent 17A verifies that a complete BIOS image 28 has been received. If the BIOS-image is complete, the operational flow 500 continues from operation 528 to operation 532 described below. If the BIOS image 28 is incomplete, the operational flow 500 continues to operation 530. At operation 530, a request for the rebroadcast of missing fragments is sent to the manager computer 4. It should be appreciated that numbers of the missing or corrupted fragments may be included in the request. The operational flow 500 then continues to operation 526 where the rebroadcast request is received at the manager computer 4. Next, the operational flow 500 continues to operation 527 where a graphical status interface is updated to display the progress of update operations. The status display may be via the input/output controller 22 and display device 25 described above in FIG. 3. The operational flow 500 then returns to operation 516 where the missing fragments of the BIOS image 28 are rebroadcast to the BIOS agent 17A.

At operation 532, in response to the BIOS image 28 being complete, the BIOS agent 17A updates the current BIOS with the new BIOS image 28. The BIOS agent 17A also sends notification of the update to the manager computer 4. It should be appreciated that the BIOS agent 17A will not acknowledge any network requests or instructions until the update is completed. The operational flow 500 then continues to operations 533 and 540. At operation 533, the BIOS agent 17A reboots the computer 2A with the new BIOS image 28 then returns control to other operations at return operation 545. Reboot of the computer 2A loads the updated BIOS 13A into the RAM 9. At operation 540, the manager computer 4 receives the notification of the update. The operational flow 500 then continues to operation 542 where the status display is updated based on the notification of update. The operational flow then returns control to other operations at return operation 544.

It should be appreciated that security measures known in the art may be used to prevent unsecured access to update operations. For example, updates may be executed behind a secure firewall, authentication credentials may be implemented, and/or pipe communication ports may be utilized to control security.

Thus, the present invention is presently embodied as methods, systems, computer program products or computer readable mediums encoding computer programs for updating and recovering firmware within one or more computing devices over a distributed network.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for updating firmware within at least one network attached computer over a distributed network comprising:
    receiving over the distributed network at the network attached computer, an instruction to begin a firmware recovery procedure, the instruction received while executing an operating system, the operating system being separate from the firmware;
    in response to receiving the instruction, rebooting the network attached computer to an operating system independent operating environment;
    receiving a new firmware image in fragments over the distributed network in the operating system independent environment;
    receiving a broadcast status request prior to updating a current firmware with the new firmware image;
    in response to receiving the broadcast status request, determining whether a rebroadcast of any fragment of the new firmware image is necessary;
    in response to determining that the rebroadcast of one or more fragments is necessary, sending a request for the rebroadcast of the fragments;
    in response to sending the request for the rebroadcast of the fragments, receiving the rebroadcast of the fragments in response to sending the request; and
    in response to receiving the new firmware image, updating the current firmware within the network attached computer with the new firmware image, in the operating system independent environment.

2. The method of claim 1, wherein the instruction to begin the firmware recovery procedure is received from a manager computer by an agent application executing on the network attached computer in an operating system dependent state, and wherein the method further comprises in response to rebooting to an operating system independent operating environment, sending a notification of readiness to update from the network attached computer over the distributed network to the manager computer.

3. The method of claim 2, wherein updating the current firmware with the new firmware image comprises erasing the current firmware and copying the new firmware image to a memory location of the network attached computer.

4. The method of claim 1, wherein determining whether the rebroadcast of any fragments of the new firmware image is necessary comprises determining whether any fragments are missing or corrupted.

5. The method of claim 1, wherein the fragments of the new firmware image are numbered.

6. The method of claim 1, wherein the distributed network supports a user datagram protocol/Internet protocol.

7. The method of claim 1, further comprising monitoring a communication port of the network attached computer for the instruction to begin the recovery procedure.

8. The method of claim 7, wherein the communication port of the network attached computer is monitored by a recovery OS application that monitors instruction activity upon only one communication port and utilizes additional processor resources on the network attached computer only upon receiving the instruction.

9. The method of claim 2, further comprising:
    in response to updating the current firmware with the new firmware image, sending a notification of the update to the manager computer.

10. The method of claim 1, further comprising:
    determining whether the current firmware is valid after being updated; and
    when it is determined that the current firmware is valid then initiating a boot of the network attached computer utilizing the current firmware.

11. The method of claim 1, wherein the firmware within the network attached computer comprises a BIOS of the network attached computer.

12. A computer-controlled apparatus capable of performing the method of claim 1.

13. A computer storage medium comprising computer executable instructions which, when executed by a computer, cause the computer to perform the method of claim 1.

14. A method for recovering BIOS on a network attached computer over a distributed network, comprising:
    determining whether a current BIOS within the network attached computer is invalid;
    booting the network attached computer with the current BIOS in response to determining that the current BIOS within the network attached computer is valid;
    while the network attached computer is in an operating system independent state, sending a recovery request in response to determining that the current BIOS is invalid, the BIOS being separate from the operating system;
    in response to sending the recovery request, receiving a new BIOS image over the distributed network; and
    in response to receiving the new BIOS image, updating the current BIOS with the new BIOS image;
    determining whether the updated current BIOS is valid after being updated with the new BIOS image; and
    in response to determining that the updated current BIOS is valid, booting the network attached computer with the updated current BIOS.

15. The method of claim 14, wherein the recovery request is sent to a network address of a recovery manager computer storing the new BIOS image.

16. The method of claim 15, wherein the network address of the recovery manager computer is stored on the network attached computer.

17. The method of claim 15, wherein the network address of the recovery manager computer is located by querying a baseboard management controller operating on the network attached computer.

18. The method of claim 14, wherein updating the current BIOS with the new BIOS image comprises erasing the current BIOS from and copying the new BIOS image to a memory location of the network attached computer.

19. The method of claim 15, wherein sending the new BIOS image comprises broadcasting the BIOS image as a broadcast packet and wherein the new BIOS image is received in fragments over the distributed network, further comprising:
    prior to updating the current BIOS and in response to receiving the new BIOS image, receiving a broadcast status request;
    in response to receiving the broadcast status request, determining whether a rebroadcast of any fragments of the new BIOS image is necessary;

in response to determining that the rebroadcast of one or more the fragments is necessary, sending a request for the rebroadcast of the fragments over the distributed network; and in response to sending the request for the rebroadcast of the fragments, receiving over the distributed network, the fragments of the new BIOS image requested.

20. The method of claim 19, wherein determining whether the rebroadcast of any fragments of the new BIOS image is necessary comprises determining whether any fragments are missing or corrupted.

21. The method of claim 19, wherein the fragments of the new BIOS image are numbered and the request for the rebroadcast excludes or includes a number for each fragment requested.

22. The method of claim 15, further comprising:

in response to updating the current BIOS with the new BIOS image, sending a notification of the update to the recovery manager computer.

23. A computer-controlled apparatus capable of performing the method of claim 14.

24. A computer-readable storage medium comprising computer executable instructions which, when executed by a computer, cause the computer to perform the method of claim 14.

25. A system for updating the firmware of at least one network attached computer over a network, the system comprising:

a first computer operative to:
    send an instruction to update the firmware of the network attached computer over the network;
    receive a notification of readiness for update from the network attached computer over the network; and
    in response to receiving the notification of readiness, send a new firmware image over the network; and a second computer comprising the network attached computer operative to:
    monitor a communications port of the second computer for the instruction to update the firmware;
    in response to receiving the instruction, transition to an OS independent recovery state;
    in response to transitioning to the recovery state, send the notification of readiness to the first computer over the network;
    in response to sending the notification of readiness, receive the new firmware image; and
    in response to receiving the new firmware image, update the current firmware with the new firmware image.

26. The system of claim 25, wherein the first computer is further operative to reboot the second computer utilizing the current firmware after the current firmware is updated with the new firmware image.

27. The system of claim 25, wherein the network supports user datagram protocol/Internet protocol, wherein the new firmware image is received in fragments over the distributed network, and wherein the second computer is further operative to:

prior to updating the current firmware and in response to receiving the new firmware image, receive a broadcast status request from the first computer; and in response to receiving the broadcast status request, identify any fragments of the new firmware image that are corrupted or missing;

in response to identifying one or more of the fragments that are corrupted or missing, send a request for the rebroadcast of the fragments identified over the network to the first computer; and in response to sending the request for rebroadcast of the fragments identified, receive over the network from the first computer, the fragments of the new firmware image requested.

28. The system of claim 25, wherein the second computer is further operative to in response to updating the current firmware with the new firmware image, send a notification of the update over the network to the first computer and wherein the system further comprises a display device wherein the first computer is further operative to display update status messages via the display device.

29. The system of claim 25, wherein the firmware comprises a BIOS of the second computer.

30. A system for recovering the BIOS of at least one network attached computer over a network, the system comprising:

a first computer operative to:
    monitor a communication port of the first computer for at least one recovery request;
    receive the recovery request from the network attached computer;
    in response to receiving the recovery request, send a new BIOS image over the network; and
    reboot the second computer with the updated current BIOS after the current BIOS is updated with the new BIOS image; and a second computer comprising the network attached computer operative to:
    determine whether a current BIOS on the second computer is invalid while in an operating system independent recovery state, the BIOS being separate from the operating system;
    in response to determining that the current BIOS is invalid, send the recovery request to the first computer over the network while the second computer is in the operating system independent recovery state;
    in response to sending the recovery request, receive the new BIOS image; and
    in response to receiving the new BIOS image, update the current BIOS with the new BIOS image.

31. The system of claim 30, wherein the network supports user datagram protocol/Internet protocol, wherein the new BIOS image is received in fragments over the network, and wherein the second computer is further operative to:

prior to updating the current BIOS and in response to receiving the new BIOS image, receive a broadcast status request from the first computer; and in response to receiving the broadcast status request, identify any fragments of the new BIOS image that are corrupted or missing;

in response to identifying one or more of the fragments that are corrupted or missing, send a request for the rebroadcast of the fragments identified over the network to the first computer; and in response to sending the request for rebroadcast of the fragments identified, receive over the network from the first computer, the fragments of the new BIOS image requested.

32. The system of claim 30, wherein the BIOS comprises a BIOS of the second computer and wherein recovery of the BIOS is executed while the second computer is in an OS independent state.

* * * * *